United States Patent [19]

Gassen et al.

[11] Patent Number: 4,928,390

[45] Date of Patent: May 29, 1990

[54] CARBURETOR AND OIL PUMP ASSEMBLY AND METHOD OF MAKING THE SAME

[75] Inventors: James R. Gassen; Lakhbir S. Suchdev, both of Charlotte, N.C.

[73] Assignee: Textron, Inc., Providence, R.I.

[21] Appl. No.: 397,047

[22] Filed: Aug. 22, 1989

[51] Int. Cl.[5] ........................ B23D 59/04; B27B 17/02; F02B 33/04

[52] U.S. Cl. ........................................ 30/123.4; 30/381; 123/73 AD

[58] Field of Search .................... 30/123.3, 123.4, 381; 184/15.1, 55.1, 11.5; 83/169; 123/41.67, 41.7, 73 AD; 261/23.2, 24, 36.2; 417/214

[56] References Cited

U.S. PATENT DOCUMENTS

| | | | |
|---|---|---|---|
| 2,605,787 | 8/1952 | Kiekhaefer | 143/32 |
| 2,944,538 | 7/1960 | Conway et al. | 123/196 |
| 3,010,538 | 11/1961 | Strunk | 184/15 |
| 3,332,411 | 7/1967 | Bloom et al. | 123/196 |
| 3,809,185 | 5/1974 | Kobayashi et al. | 184/15 R |
| 3,865,213 | 2/1975 | McDermott | 123/196 CP |
| 4,094,382 | 6/1978 | Lee | 30/123.4 |
| 4,636,147 | 1/1987 | Schweitzer et al. | 30/123.4 |
| 4,644,658 | 2/1987 | Dolata et al. | 30/381 |
| 4,770,130 | 9/1988 | Nagashima | 30/381 |
| 4,802,555 | 2/1989 | Matsunaga et al. | 184/15.1 |
| 4,819,332 | 4/1989 | Sugihara et al. | 30/123.4 |
| 4,835,866 | 6/1989 | Nagashima | 30/381 |

*Primary Examiner*—Douglas D. Watts
*Assistant Examiner*—Paul M. Heyrana, Sr.
*Attorney, Agent, or Firm*—Perman & Green

[57] ABSTRACT

A carburetor and chain oiling assembly and method of manufacturing the same for use in a chain saw. The assembly generally comprises a carburetor section, an oil pump section and a cover connecting the two sections. The cover can connect the oil pump section to the carburetor section forming a cover for a carburetor fuel diaphragm and a working chamber with an oil pump diaphragm. The cover has a gas conduit between the carburetor housing and the working chamber such that gas pulses from an engine crankcase can be supplied to the working chamber to operably move the oil pump diaphragm to provide a continuous and automatic metered flow of oil to a saw chain.

18 Claims, 2 Drawing Sheets

CARBURETOR AND OIL PUMP ASSEMBLY AND METHOD OF MAKING THE SAME

BACKGROUND OF THE INVENTION

I. Field of the Invention

The present invention relates to internal combustion engines and, more particularly, to a carburetor and oil pump assembly for use in a chain saw and method of making the same.

II. Prior Art

Various different carburetors and chain oiling systems for use in chain saws are generally known in the art. One type of carburetor for use in chain saws is known as a diaphragm carburetor which is capable of maintaining a constant fuel pressure and thereby acts as a pressure regulating device to allow the chain saw to operate properly, even at relatively extreme or different attitudes or orientations and with pressurized gas tanks.

Various different lubricating systems for chain saws can be found in the prior art. U.S. Pat. No. 3,865,213 to McDermott describes an automatic pump for continuously pumping oil from a reservoir to a saw chain having a relatively small piston and a diaphragm which is actuated by pressure pulses developed in the crankcase of the engine. U.S. Pat. No. 4,644,658 to Dolata et al describes a working tool which is equipped with a device for interrupting the supply of oil to a tool which facilitates the use of chain saw apparatus with an accessory attachment tool such as a hedge trimmer, drilling tool or the like for which a flow of lubricating oil is unnecessary. U.S. Pat. No. 4,802,555 to Matsunaga et al describes a pressurized oil tank communicating with a crankcase of the engine where pressure forces oil from the oil tank to lubricate a saw chain. U.S. Pat. No. 2,944,538 to Conway et al describes a combined manual and automatic lubrication system for a chain saw that will assure an adequate flow of lubricant to the saw chain having a low pressure automatic lubrication system activated in response to a predetermined throttle position and a high pressure pump lubrication system selectively activated by an operator by depression of a manual pump plunger. U.S. Pat. No. 3,809,185 to Kobayashi et al disclosed an oil feed pump of a chain saw disposed in a chain saw crankcase. A cam portion of the crank shaft reciprocates the pump plunger so that oil passages which communicate with the cylinder bore delivers oil therein to be pumped to the point of use by the plunger. U.S. Pat. No. 3,332,411 to Bloom et al discloses a lubricating system for a power driven chain saw which automatically delivers a continuous flow of lubrication and which includes a selectively operated manual means to provide lubricant under relatively high pressure for clearing the lubricant passages from natural clogging after repeated usage. U.S. Pat. No. 3,010,538 to Strunk discloses a chain saw lubricating system having a pressurized oil reserve for providing oil to a saw chain. U.S. Pat. No. 2,605,787 to Kiekhaefer discloses a pressure lubricating system for an engine driven chain saw for delivery of oil to the saw chain during operation of the engine.

A continuing problem has existed with tools such as chain saws in that the number of parts and manufacturing and assembly methods generally make the manufacture and assembly of a tool relatively expensive, require additional quality controls, and adds weight to a hand held tool that can thus become heavy and cumbersome for an operator.

It is therefor an objective of the present invention to incorporate a chain oiler with a chain saw carburetor and supply the combined functions in a miniaturized and automatic assembly.

It is another objective of the present invention to provide a carburetor and oil pump assembly which is relatively easy to manufacture and assemble and which comprises relatively few parts.

It is another objective of the present invention to provide a carburetor and oil pump assembly which can be manufactured and assembled at a relatively reduced cost from that of prior art devices.

It is another objective of the present invention to provide a carburetor and oil pump assembly having fewer parts than prior art devices which greatly eases total chain saw assembly.

It is another objective of the present invention to provide a carburetor and oil pump assembly which can provide both chain oiling and engine oil injection and/or in carburetor blending of fuel mix with oil.

It is another objective of the present invention to provide a carburetor and oil pump assembly having a two-stage oil pump used to reduce close tolerance requirements required for a single stage priming while also affording relatively high chain oil pressure.

SUMMARY OF THE INVENTION

The foregoing problems are overcome and other a advantages are provided by a carburetor and automatic saw chain oiler assembly for use in a chain saw.

In accordance with one embodiment of the invention, a chain saw is provided having an engine with a crankcase, a saw chain, and a carburetor and saw chain oiler assembly. The carburetor and saw chain oiler assembly generally comprises a first frame means, a piston means, an oil pump diaphragm, a carburetor means, and second frame means. The first frame means has an oil outlet, an oil inlet, a first conduit means connecting the inlet to the outlet and a first recess. The piston means has a piston member at least partially positioned in the first conduit means and adapted for reciprocable movement therein. The oil pump diaphragm is connected to the first frame means and the piston member proximate the first recess. The carburetor means has a carburetor housing and a carburetor fuel diaphragm. The second frame means has a first side with a second recess, a second side with a third recess and a first gas conduit means between the second recess and the second side adapted for communication with a gas conduit in the carburetor housing which extends from the engine crankcase. The second side of the second frame means is generally mounted to the carburetor housing with the third recess adapted to allow the fuel diaphragm of the carburetor relatively free movement. The first frame means is mounted to the second frame means with the first and second recesses forming a diaphragm moving area for the oil pump diaphragm with a working chamber formed by the second recess and oil diaphragm such that gas pressure pulses from the crankcase can be supplied to the second recess to move the oil pump diaphragm for moving the piston member to pump oil from the inlet to the outlet for oiling the saw chain whereby the carburetor and chain oiler assembly has a relatively small size, relatively light weight and a relatively few number of parts.

In accordance with another embodiment of the invention, a carburetor and automatic saw chain oiler assembly is provided for use in a chain saw having an internal combustion engine. The combined carburetor and oiler assembly generally comprises a carburetor means, an oil pump means, and a cover frame means. The carburetor means has a housing means and a fuel diaphragm. The oil pump means has a pump frame means, a piston means, and an oil diaphragm connecting one end of the piston means with the pump frame means. The cover frame means connects the carburetor means with the oil pump means. The cover frame means generally comprises a frame member adapted to form a cover for the carburetor fuel diaphragm further being adapted to form a working chamber with the oil diaphragm whereby the combined carburetor and oiler assembly is relatively compact with relatively few number of parts.

In accordance with one method of the present invention, a method of manufacturing a combined carburetor and oiler assembly for use with an internal combustion engine generally comprises the steps of providing a pump housing member with a piston bore and a first diaphragm recess, mounting an oil piston assembly with the pump housing member, the piston assembly having a piston adapted for movement in the piston bore and a piston driving diaphragm, connecting the pump housing member with the oil piston assembly to a cover member, the cover member having a second recess on a first side adjacent the oil piston assembly and a third recess on a second side, and connecting the cover member to a carburetor housing member, the cover member substantially separating and being sandwiched between the pump housing member and oil pump assembly and the carburetor housing member, the second recess and piston driving diaphragm forming a working chamber for moving the piston member, and the third recess forming a relief chamber with a carburetor fuel diaphragm whereby the pump housing member, cover member and carburetor housing member are integrally connected to form a combined carburetor and oiler assembly.

BRIEF DESCRIPTION OF THE DRAWINGS

The foregoing aspects and other features of the present invention are explained in the following description, taken in connection with the accompanying drawings, wherein.

DETAILED DESCRIPTION OF THE INVENTION

Figure 1:
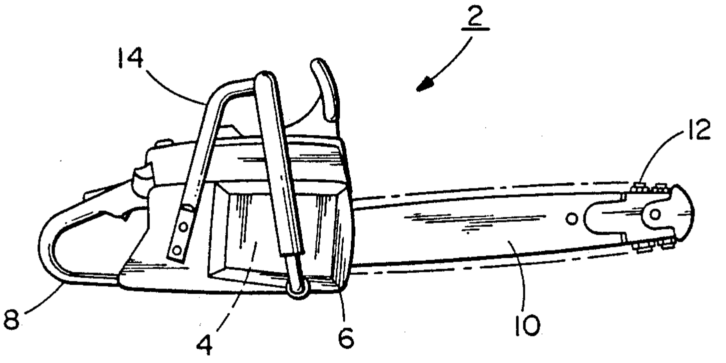
FIG. 1 is a plane side view of a chain saw incorporating features of the present invention.

Referring to FIG. 1, there is shown a plane side view of a chain saw 2 incorporating features of the present invention. In the embodiment shown, the chain saw 2 generally comprises an internal combustion engine 4 located within a housing 6, a rear handle 8 formed as part of the housing 6, a guide bar 10 for accommodating a saw chain 12 for movement thereon and a front handle 14. Although the present invention is being described with use in a chain saw, it should be understood that the present invention can be used with any tool having an internal combustion engine requiring the delivery of fluids for auxiliary purposes. In the embodiment shown, lubrication of the saw chain 12 such that the chain can move on the guide bar 10 with diminished friction is generally provided within the housing 6.

Figure 2:
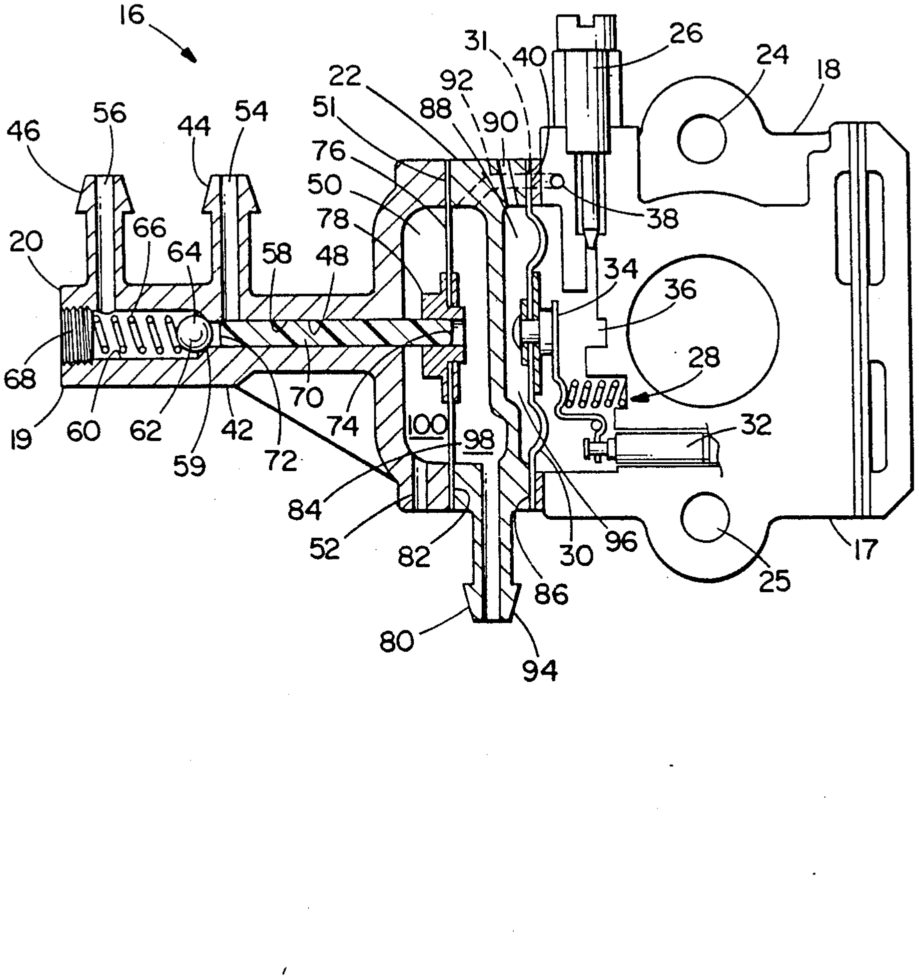
FIG. 2 is a partial cross sectional view of a carburetor and oil pump assembly used in the chain saw shown in FIG. 1.

Referring also to FIG. 2, there is shown a partial cross sectional view of a carburetor and oil pump assembly 16 incorporating features of the present invention. The assembly 16 generally comprises a carburetor section 17, an oil pump section 19 and a cover 22 connecting the two sections. The carburetor section 17 is generally comprised of a frame or housing 18 made of a suitable material such as metal. The carburetor housing 18 is generally intended to be mounted to the engine 4 within the housing 6 via mounting holes 24 and 25. In the embodiment shown, the carburetor section 17 is an all attitude position carburetor having a pressure regulating means for maintaining constant fuel pressure on metering orifices (not shown). Generally, the carburetor section 17 comprises a fuel inlet (not shown) and a fuel inlet needle 26, a fuel diaphragm mechanism 28 and a fuel pump (not shown). Generally, the fuel diaphragm mechanism 28 comprises a diaphragm 30, a fuel valve 32 and a mechanism 34 for connecting the diaphragm 30 to the fuel valve 32. The diaphragm 30, in the embodiment shown, is generally comprised of a flexible resilient material. The connecting mechanism 34 is connected to the center of the diaphragm 30. The outer perimeter of the diaphragm 30 is sandwiched between the cover 22 and the carburetor housing 18. Because of its flexible and resilient nature, the center of the diaphragm 30 can move relative to its relatively fixed outer perimeter, thus allowing the connecting mechanism 34 to move. The diaphragm 30 generally cooperates with the carburetor housing 18 to form a fuel reservoir 36. In the embodiment shown, the diaphragm carburetor is generally provided such that fuel from a pressurized fuel tank (not shown) and/or a fuel pump (not shown) in the carburetor can be maintained in the fuel reservoir 36 at a relatively constant fuel pressure such that it can be provided to the engine by the valve 32 at a relatively constant fuel pressure as required by the metering orifaces. In the embodiment shown, the carburetor housing 18 comprises a gas conduit 38. The gas conduit 38 generally communicates from a side of the carburetor housing 18 that is intended to be mounted to the engine 4 and a side 40 proximate the fuel diaphragm 30. The gas conduit 38, when the carburetor housing 18 is connected to the engine 4, communicates with the crankcase of the engine 4. As is usual in a two-stroke internal combustion engine, the crankcase of the engine 4 is generally utilized for induction and pre-compression of the air/fuel mixture for the engine. Thus, during the compression stroke of the piston of the engine 4, a partial vacuum is established in the crankcase whereby a carburated mixture of air and liquid fuel having a lubricant mixed therewith is drawn into the crankcase. During the subsequent power stroke of the piston, the fuel/air mixture is compressed in the crankcase. Thus, with the gas conduit 38 communicating with the crankcase, the gas conduit 38 will have pressure pulses and vacuum pulses of gas therein. These pulses are generally used for operating the oil pump as will be described below.

The oil pump section 19 has a housing 20 which is made of a suitable material, such as metal, and generally comprises a frame member 42, an oil inlet 44, an oil outlet 46, a center conduit 48, a recess 50 and an aperture 52. The oil inlet 44 and oil outlet 46 each comprise a conduit 54 and 56 that communicates with the center conduit 48. The center conduit 48 generally comprises a first section 58 and a second enlarged section 60. In the embodiment shown, the oil inlet conduit 54 communicates with the first section 58 of the center conduit 48 and the oil outlet conduit 56 communicates with the second enlarged section 60. In the embodiment shown, the center conduit 48 extends through the frame 42 into the recess area 50. The aperture 52 generally communicates from the recess area 50 through the frame 42 to the exterior of the housing 20. The oil inlet 44 is generally connected to an oil reservoir (not shown) such that oil can be supplied to the assembly 16. The oil outlet 46 is generally connected to a mechanism (not shown) for dispensing oil on the saw chain 12. In the embodiment shown, mounted within the oil pump housing 20 is a flow check valve 62 generally comprising a ball 64, a spring 66 and a plug 68. Generally, the flow check valve 62 biases the ball 64 at a junction 59 between the first section 58 and second enlarged section 60 of the center conduit 48 to prevent the free flow of oil from the oil inlet 44 to the oil outlet 46 unless the oil pump is operational. Also mounted, at least partially, in the center conduit 48 is a piston 70 having a first end 72 located proximate the oil inlet conduit 54 and a piston second end 74 connected to an oil pump diaphragm 76 via a connector 78. In the embodiment shown, the piston 70 is suitably sized and shaped to form a relatively precise fit within the center conduit 48. With the presence of oil in the center conduit 48 from the oil inlet 44, the oil forms a seal between the piston 70 and the center conduit 48 such that oil will not substantially flow through the center conduit 48 into the recess 50. However, in an alternate embodiment of the invention, additional seal means between the piston 70 and center conduit 48 may be provided.

As shown in this embodiment, the cover 22 is generally sandwiched between the carburetor housing 18 and the oil pump housing 20. The cover 22, in the embodiment shown, is generally comprised of a single frame member 80 having a first side 82 with a second recess 84 proximate the oil pump housing 20 and a second side 86 having a third recess 88 proximate the carburetor housing 18. The frame member 80 is made of a suitable material such as metal. However, the cover 22 and oil pump housing 20 may be made of a non-metallic material. In the embodiment shown, the frame member 80 also comprises an aperture 90 passing through the frame member between the third recess 88 and the exterior of the cover, a gas conduit 92 located through the frame member 80 between the second side 86 and the second recess 84, and a gas outlet 94 passing through the frame member 80 between the second recess 84 and the exterior of the cover 22 which can be connected to the oil tank of the chain saw for pressurizing the oil tank. In the embodiment shown the fuel diaphragm 30 comprises a suitable aperture 31 such that the cover gas conduit 92 can communicate with the carburetor housing gas conduit 38. Thus, gas pulses in the crankcase of the engine 4 can be transmitted into the second recess 84 by means of the two gas conduits 38 and 92.

In the assembly shown in FIG. 2, the oil pump housing 20, oil pump diaphragm 76, cover 22, fuel diaphragm 30 and the carburetor housing 18 are connected to each other by suitable bolts (not shown) which fixedly retain the members of the assembly together. The cover 20, fuel diaphragm 30 and carburetor housing 18 cooperate in the sandwiched configuration shown to prevent fuel from inadvertently leaking from the fuel reservoir 36. The third recess 88 of the cover 22 defines a relief area or chamber 96 for the fuel diaphragm 30 such that the diaphragm 30 can move back and forth relative to the fuel reservoir 36 and relief chamber 96 such that the diaphragm 30 can properly perform its fuel pressure regulating function. The aperture 90 is generally provided such that the relief chamber 96 is maintained at atmospheric pressure thereby preventing gas pressure build up or resistance in the relief chamber 96 which could prevent the fuel diaphragm 30 from operating properly. In addition to the functions described above, the cover 22 also provides the general function of protecting the fuel diaphragm 30 from foreign objects thereby preventing inadvertent damage to the diaphragm 30.

The oil pump diaphragm 76 generally also is comprised of a flexible and resilient material and has an outer periphery which is sandwiched between the first side 82 of the cover 22 and a first side 51 of the oil pump housing 20. The oil pump housing 20 and cover 22 generally form an oil diaphragm movement area having a working chamber 98 formed by the second recess 84 and the oil pump diaphragm 76, and a relief chamber 100 formed by the first recess 50 and the oil pump diaphragm 76. The relief chamber 100 performs substantially the same function as the relief chamber 96 formed by the third recess 88 and the fuel diaphragm 30. The aperture 52 allows the relief chamber 100 to be maintained at atmospheric pressure. The working chamber 98, as described above, communicates with the crankcase of the engine 4 via the gas conduit 92 in the cover 22 and the gas conduit 38 in the carburetor housing 18. Pulses of gas from the crankcase of the engine 4 can thus be delivered to the working chamber 98. These gas pulses resonate or oscilate gas pressure in the working chamber 98 which causes the oil pump diaphragm 76 to oscilate. The piston 70, being connected to the oil pump diaphragm 76 via the connector 78, is moved by the oil pump diaphragm 76 to reciprocate back and forth within the center conduit 48 of the oil pump housing 20. The piston first end 72 being located proximate the oil inlet conduit 54 will generally perform two functions. First, when the piston 70 is moved towards the working chamber 98 and away from the ball 64 the piston first end 72 cooperates with the flow check valve 62 to form a vacuum within the center conduit 48 to draw oil into the oil pump housing 20 via the oil inlet 44. When a pressure pulse of gas is delivered to the working chamber 98 the piston 70 is driven forward towards the check valve 62. The piston first end 72 pushes against the oil in the center conduit 48 which hydrostatically moves the ball 64 of the flow check valve 62 away from its seat at the junction 59 of the first section 58 and enlarged section 60, at least partially compressing the spring 66, and allowing the oil to flow from the first section 58 to the enlarged section 60 and out the oil outlet 46. The gas outlet 94, as described above, is generally provided to be connected to the oil tank for pressurizing the oil tank whereby gases from the crankcase of the engine passing through the working chamber 98 can be transported to the oil tank. However, in an alternate embodiment of the present invention, the gas outlet 94 need not be provided. As can be seen, the carburetor and oil pump assembly 16 is relatively small in size, relatively light in weight and has a relatively few number of parts which allows for easier and less expensive assembly and manufacture. The present invention allows the cover 22 to perform both a carburetor function as well as an oil pump function in a single member as well as eliminating any exterior conduiting of gases from the crankcase that would otherwise be necessary if the oil pump and carburetor were not provided as a single assembly. The internal conduiting of gases from the crankcase of the engine 4 to the working chamber 98 via the conduits 92 and 38 thus reduces the member of parts and allows easier assembly.

Figure 3:
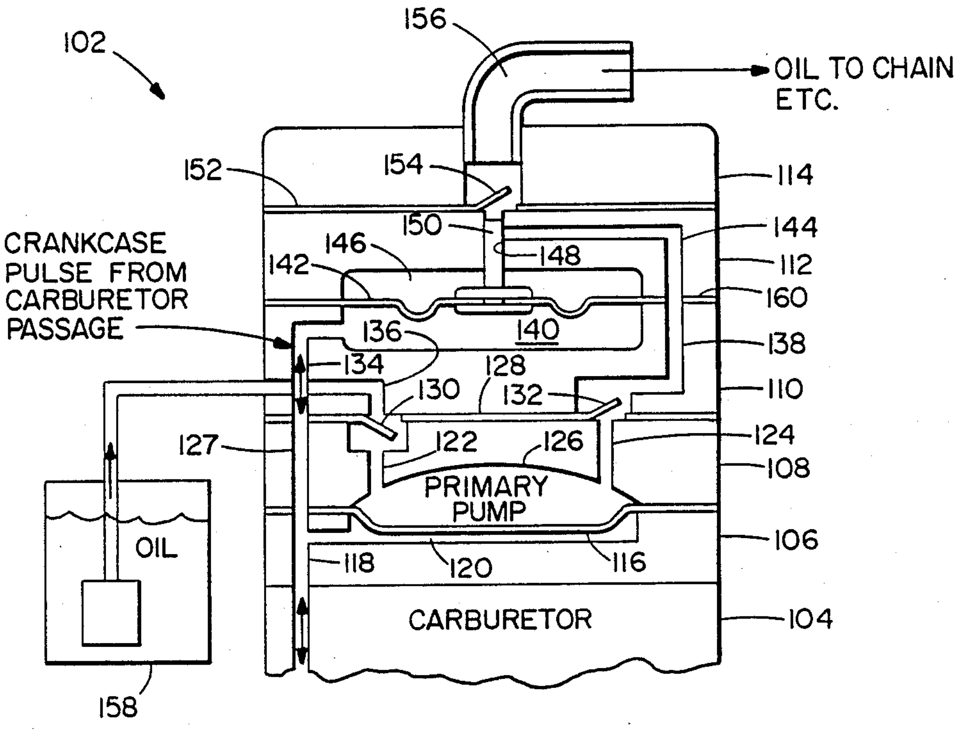
FIG. 3 is a schematic view of an alternate embodiment of the present invention.

Referring now to FIG. 3, there is shown a schematic view of an alternate embodiment of the invention. In the embodiment shown, a carburetor and oil pump assembly 102 has a carburetor housing 104, a primary pump base 106, a primary pump body 108, a secondary pump base 110, a secondary pump body 112 and an outlet cover 114. In the embodiment shown, a primary pump diaphragm 116 is generally sandwiched between the primary pump base 106 and the primary pump body 108. The primary pump base 106 generally comprises a gas conduit 118 and a primary pump recess 120. The primary pump body 108 generally comprises and oil inlet conduit 122, an oil outlet conduit 124, a second primary pump recess 126 and a gas conduit 127. In the embodiment shown, sandwiched between the primary pump body 108 and the secondary pump base 110 is a seal member 128 having an inlet flap 130 and an outlet flap 132. The secondary pump base 110 generally comprises a gas conduit 134, an oil inlet conduit 136, an oil outlet conduit 138 and a secondary pump recess 140. In the embodiment shown, sandwiched between the secondary pump base 110 and the secondary pump body 112 is an oil pump diaphragm 142. The secondary pump body 112 generally comprises an oil inlet conduit 144, a secondary pump recess 146 and a central secondary pump conduit 148. A plunger member 150 is suitably connected to the secondary pump diaphragm 142 and at least partially positioned in the central conduit 148 for reciprocable movement therein. Sandwiched between the secondary pump body 112 and the outlet cover 114 is a seal member 152 having a flap 154. The outlet cover 114 generally comprises a conduit 156 for supplying oil to the saw chain. The secondary pump base oil inlet conduit 136 is suitably connected to an oil reservoir 158 which may or may not be pressurized. Suitable apertures are provided in the primary pump diaphragm 116 and the first seal member 128 such that gases can communicate through the three gas conduits 118, 127 and 134. Thus, gas pulses from the crankcase of an engine can be transmitted to the primary pump base recess 120 and the secondary pump base recess 140. With the oscillating vacuum pulses and pressure pulses of gases behind the primary pump diaphragm 116 and secondary pump diaphragm 142 oil can be pulled from the oil reservoir 158 through the oil inlet conduit 136 passed the inlet flap 130 into the primary pump area between the primary pump diaphragm 116 and the primary pump body 108. Oil can then be pushed through the oil outlet conduit 124 passed the outlet flap 132 through the secondary pump base oil conduit 138 through a hole 160 in the secondary pump diaphragm 142 oil inlet conduit 144 to the central conduit 148 where the plunger member 150 can meter the flow of the oil passed the flap 154 out the outlet cover conduit 156 to the saw chain. It should be understood that the above described alternate embodiment of the invention is only intended to be illustrative of a dual pump oiling system. Although the carburetor and oil pump assembly 102 need not be used with a diaphragm carburetor, the assembly 102 could nonetheless be adapted for such use. In addition, alternative or additional oil pumping means may also be provided. In the embodiment shown, the primary oil pump can generally provide fault free priming of the secondary pump and the secondary pump can provide a metered pressure flow of oil to the saw chain.

Figure 4:
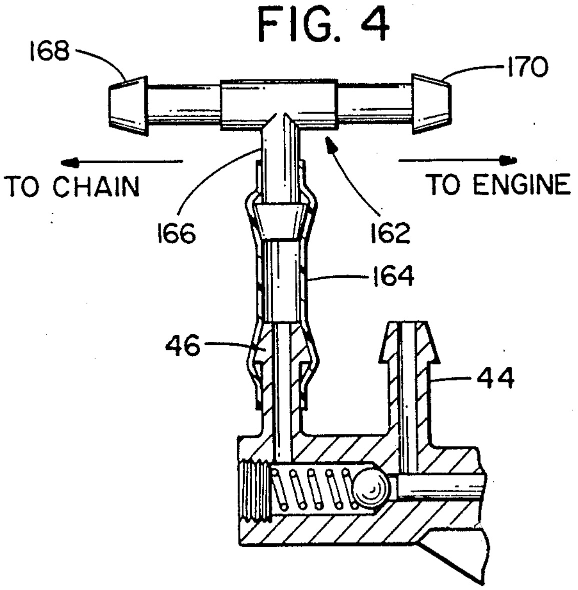
FIG. 4 is a schematic view of another alternate embodiment of the present invention.

Referring now to FIG. 4, there is shown a schematic view of the end of the oil pump of the assembly shown in FIG. 2 having a special oil flow attachment 162 attached to the oil outlet 46. In the embodiment shown, the oil flow attachment 162 generally comprises a conduit 164 and a flow divider 166. The flow divider 166 is generally capable of supplying oil to both the saw chain and for mixing with gasoline for two cycle engines. Oil to the chain can generally exit the flow divider 166 via a first outlet 168 and oil for the engine can generally be transported out a second outlet 170.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A chain saw having an engine with a crankcase, a saw chain, and a carburetor and saw chain oiler assembly, said assembly comprising:

first frame means having an oil inlet, an oil outlet, a first conduit means connecting said inlet and said outlet, and a first recess;

piston means having a piston member at least partially positioned in said first conduit means and adapted for reciprocal movement therein;

an oil pump diaphragm connected to said first frame means and said piston member proximate said first recess;

carburetor means having a carburetor housing and a carburetor fuel diaphragm; and second frame means having a first side with a second recess, a second side with a third recess and a first gas conduit means between said second recess and said second side adapted for communication with a gas conduit in said carburetor housing extending from said crankcase, said second side being mounted to said carburetor housing with said third recess adapted to allow said fuel diaphragm of said carburetor relatively free movement, said first frame means being mounted to said second frame means with said first and second recesses forming a diaphragm movement area for said oil pump diaphragm with a working chamber formed by said second recess and said oil diaphragm such that gas pressure pulses from said crankcase can be supplied to said second recess to move said oil pump diaphragm for moving said piston member to pump oil from said inlet to said outlet for oiling said saw chain whereby the carburetor and chain oiler assembly has a relatively small size, relatively light weight and a relatively few number of parts.

2. A chain saw as in claim 1 further comprising an oil flow check valve means mounted in said first conduit means between said oil inlet and said oil outlet.

3. A chain saw as in claim 1 wherein said first frame means further comprises a first aperture means between said first recess and an outer wall of said first frame means such that said oil pump diaphragm and said first recess form a first relief chamber substantially open to the atmosphere by said first aperture means whereby said oil pump diaphragm is not substantially hindered from movement in said first recess.

4. A chain saw as in claim 1 wherein said piston member and said first conduit means are suitably sized and shaped such that oil from said oil inlet forms a seal between said piston member and said first conduit means to substantially prevent oil from exiting said first conduit means into said first recess.

5. A chain saw as in claim 1 wherein said second frame means comprise means for connecting said working chamber with on oil tank for pressurizing the oil tank.

6. A chain saw as in claim 1 wherein said second frame means further comprises a second aperture means between said third recess and an outer wall of second frame means such that said fuel diaphragm and said third recess form a second relief chamber substantially open to the atmosphere by said second aperture means whereby said fuel diaphragm is not substantially hindered from movement in said third recess.

7. A chain saw as in claim 1 wherein said second frame means and said fuel diaphragm substantially seal a fuel flow area in said carburetor, and said oil diaphragm and said second frame means substantially seal said working chamber.

8. A chain saw as in claim 1 wherein said second frame means further comprises a primary oil pump means for supplying oil to said first frame means.

9. A chain saw as in claim 8 wherein said primary oil pump means comprises a primary oil diaphragm and a second gas conduit means such that gas pressure pulses from said crankcase can drive said primary oil pump means.

10. A carburetor and automatic saw chain oiler assembly for use in a chain saw having an internal combustion engine, the combined carburetor and oiler assembly comprising:

- carburetor means having a housing means and a fuel diaphragm;
- oil pump means having a pump frame means, a piston means, and an oil diaphragm connecting one end of said piston means with said pump frame means; and
- cover frame means connecting said carburetor means with said oil pump means, said cover frame means comprising a frame member being adapted to form a cover for said carburetor fuel diaphragm and further being adapted to form a working chamber with said oil diaphragm whereby the combined carburetor and oiler assembly is relatively compact with a relatively few number of parts.

11. An assembly as in claim 10 further comprising gas conduit means in said carburetor housing means and said cover frame means for supplying gas pressure pulses from an engine to said working chamber to move said oil diaphragm.

12. An assembly as in claim 10 wherein said cover frame means comprises a single frame member.

13. An assembly as in claim 11 wherein said pump frame means and said piston means cooperate such that gas pressure pulses in said working chamber drive said oil diaphragm which reciprocates said piston means to provide a metered pressure flow of oil by said pump means.

14. An assembly as in claim 10 wherein said oil pump means further comprises an oil inlet and an outlet, said oil outlet having means for supplying oil to a saw chain and means for supplying oil for lubricating cylinders of an engine.

15. An assembly as in claim 14 wherein said means for supplying oil for lubricating cylinders of an engine comprises means for mixing oil with a fuel prior to combustion.

16. A method of manufacturing a combined carburetor and oiler assembly for use with an internal combustion engine comprising the steps of:

- providing a pump housing member having a piston bore and a first diaphragm recess;
- mounting an oil piston assembly with the pump housing member, the piston assembly having a piston member adapted for movement in the piston bore and a piston driving diaphragm;
- connecting the pump housing member and oil piston assembly to a cover member, the cover member having a second recess on a first side adjacent the oil piston assembly and a third recess on a second side; and
- connecting the cover member to a carburetor housing member, the cover member substantially separating and being sandwiched between the pump housing member and the carburetor housing member, the second recess and piston driving diaphragm forming a working chamber for moving the piston member, and the third recess forming a relief chamber for a carburetor fuel diaphragm whereby the pump housing member, cover member and carburetor housing member are integrally connected to form a combined carburetor and oiler assembly.

17. A method as in claim 16 wherein the step of connecting the cover member to the carburetor housing member comprising aligning a gas conduit in the cover member with a gas conduit in the carburetor housing and sandwiching at least a portion of the carburetor fuel diaphragm therebetween.

18. A method as in claim 17 wherein the step of connecting the cover member to the pump housing member comprises sandwiching at least a portion of the piston driving diaphragm therebetween.

* * * * *